United States Patent Office 2,864,858
Patented Dec. 16, 1958

2,864,858

PREPARATION OF ORGANIC ACIDS HAVING A QUATERNARY ALPHA CARBON ATOM

Abraham Schneider, Overbrook Hills, Pa., assignor to Sun Oil Company, Philadelphia, Pa., a corporation of New Jersey No Drawing. Application January 23, 1956
Serial No. 560,871

17 Claims. (Cl. 260—514)

This invention relates to the preparation of organic acids, and more particular relates to the preparation of organic acids having a quartenary alpha carbon atom.

Organic acids having a quaternary alpha carbon atom, which are trisubstituted acetic acids such as 2,2-dimethylpropanoic acid (pivalic acid), have heretofore been prepared, for example, from tertiary butyl cyanide, or from a Grignard reagent and carbon dioxide, or from carbon monoxide and an olefin reacted in vapor phase at elevated temperatures and pressures. The preparation of trisubstituted acetic acids having higher alkyl radicals as substituents are difficult to prepare although certain methods have been described. For example, a procedure has been described which involves introducing a tertiary group a furan nucleus and then oxidizing to split the ring and yield the desired trisubstituted acetic acid. Such procedures are difficult, require expensive reagents and/or reactants, and frequently result in only a small yield of the desired product.

It has now been found that certain saturated hydrocarbons can be reacted directly with carbon monoxide by subjecting a mixture of the hydrocarbon and carbon monoxide to the simultaneous action of an olefin-acting material and a strong acid such as hydrogen fluoride. According to the invention, when a strong acid such as hydrogen fluoride and an olefin-acting material are brought together, in liquid phase, in the presence of carbon monoxide and a saturated hydrocarbon containing a tertiary hydrogen atom, a catalytic condition is established which is effective to cause the carbon monoxide to react with the hydrocarbon. On hydrolysis of the reaction mixture, an acid is obtained in which the alpha carbon atom is a quaternary carbon atom, i. e., a trisubstituted acetic acid is formed as the product.

The mechanism of the reaction is complicated and not completely understood. The overall reaction, however, can be illustrated by the following equation:

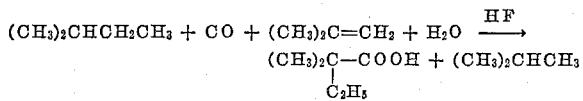

in which isopentane, isobutylene and hydrogen fluoride are used to illustrate tertiary hydrogen-containing hydrocarbons, olefin-acting materials, and acidic catalysts, respectively, which can be employed. It will be noticed that isobutane is a product, and it has been found characteristic of the reaction that a substantial proportion of the olefin-acting material employed is converted to the corresponding paraffin. It is also characteristic of the reaction that the trisubstituted acetic acid product has one more carbon atom than the saturated hydrocarbon. A further characteristic of the process is that substantially no alkyl fluorides are formed. Another characteristic is that the reaction occurs substantially instantaneously, i. e., the reaction is complete as soon as the reactants are mixed.

For the convenience the process of the invention is herein largely described using isopentane as the hydrocarbon, isobutylene as the olefin-acting material and hydrogen fluoride as the catalyst, as required by the process, but the scope of the invention is not limited to such specific materials.

In practicing the invention, it is preferred to prepare an emulsion of isopentane and carbon monoxide in hydrogen fluoride, and to contact this emulsion with isobutylene, such as by introducing isobutylene into the emulsion. However, the reactants may be otherwise contacted, such as by continuously contacting a stream of isopentane and hydrogen fluoride with a stream of carbon monoxide admixed with isobutylene, or by simultaneously but separately introducing carbon monoxide and isobutylene into an emulsion of isopentane in hydrogen fluoride, it being necessary only that the olefin and hydrogen fluoride be contacted only in the presence of both the isopentane and the carbon monoxide. After reaction between the carbon monoxide and isopentane, the acid layer is separated from the hydrocarbon layer. The temperature of the separated acid layer is adjusted, if necessary to within the range of from 0° C. to 100° C., and water added to hydrolyze the reaction product and form the organic acid. The so-formed acid is then separated as the product of the process.

Saturated hydrocarbons having at least one tertiary hydrogen atom per molecule are reactants in the process. By the expression "tertiary hydrogen atom" is meant a hydrogen atom which is attached to a tertiary carbon atom. Isoparaffins having a tertiary hydrogen atom give good results in the process and are prefered. As illustrative of isoparaffins that give good results may be mentioned isobutane, isopentane, 2-methylpentane, 3-methylpentane, 2,4-dimethylpentane, 2-ethylpentane, 2-ethylhexane, 2-ethyldecane, 2-methyldecane, 3-butyldecane, and homologues and isomers thereof. Cycloparaffins having a tertiary hydrogen atom also give good results. Suitable cycloparaffins include, for example, methylcyclopentane, ethylcyclopentane, n-propylcyclopentane, isopropylcyclopentane, 1,2-dimethylcyclopentane, the butyl, amyl, hexy, heptyl and decyl cyclopentanes, methylcyclohexane, ethylcyclohexane, n-propylcyclohexane, isopropylcyclohexane, 1,2 - dimethylcyclohexane, 1,4 - dimethylcyclohexane, 1 - methyl - 2 - ethylcyclohexane, the hexyl, heptyl, octyl and decyl cyclohexanes, and homologues and isomers thereof. Napththenes having fused rings, such as decahydronaphthalene, perhydroanthracene, perhydrophenanthracene, bicyclopentyl, bicyclohexyl, and alkyl substituted derivatives thereof can be used with good results. It is preferred to use a saturated hydrocarbon having not more than 30 carbon atoms per molecule to obtain good results in the process. Saturated hydrocarbons having two tertiary hydrogen atoms can be employed, in which case the carbon monoxide reacts with either or both of the tertiary carbon atoms to form a mixture of acids including the dicarboxylic acid.

As above described, a saturated hydrocarbon having a tertiary hydrogen atom is a reactant in the process. Mixtures of such hydrocarbons also give good results, a mixture of acids corresponding to the hydrocarbons present being obtained. Petroleum fractions containing a major proportion of such hydrocarbons give good results. A petroleum fraction may be used to supply both the saturate hydrocarbon and the olefin required, as described herein.

The olefin-acting material to employ must have at least two carbon atoms per molecule and preferably has at least three carbon atoms per molecule. Olefins including cycloolefins, alkyl halides and alcohols can be used but are not necessarily equivalent under all reaction conditions. Tertiary olefins, i. e., olefins which have one olefinic double bond attached to a tertiary carbon atom are preferred. Suitable tertiary olefins include, for example, isobutylene, 2-methylbutene-1, 2-methylbutene-2, 2-methylpentene-1, 2-methylpentene-2, 3-ethylpentene-2, 2-methyldecene-1, 1-methylcyclopentene, 1-methylcyclohexene, and homologues and isomers thereof. However, secondary olefins, i. e., olefins which have one double bond attached to a secondary carbon atom, can be employed, such as propylene, n-butene-1, n-butene-2, n-pentene-2, n-pentene-3, 3-methylbutene-1, 3-methylcyclopentene, 4-methylcyclohexene, and the like. It is preferred to employ an olefin having a total of not more than about 10 carbon atoms per molecule, but olefins having up to about 20 carbon atoms per molecule are operable. When using an olefin, a strong acid catalyst gives excellent results. Hydrogen fluoride is the preferred catalyst, but other strong acids such as sulfuric acid, hydrated boron trifluoride and fluosulfonic acid give good results.

Alkyl halides which can be used as the olefin-acting materials include the primary, secondary and tertiary alkyl chlorides and fluorides having at least two, and preferably three, carbon atoms per molecule. Cyclic fluorides and chlorides, such as cyclohexyl fluoride and cyclopentyl chloride are included in the operable alkyl halides. With such alkyl halides it is preferred to use as the acid catalyst a Fried-Crafts catalyst having a halogen atom which is the same as the halogen atom of the alkyl halide. Thus, it is preferred to use boron trifluoride or hydrogen fluoride with alkyl fluorides, or to use aluminum trichloride with alkyl chlorides. Suitable alkyl chlorides and fluorides include, for example, ethyl, n-propyl, iso-propyl, n-butyl, iso-butyl and tertiary butyl chlorides and fluorides, and their amyl, hexyl, heptyl, octyl, nonyl and decyl homologues and isomers. It is preferrred to employ an alkyl halide having not more than about 10 carbon atoms per molecule, but alkyl halides having up to about 20 carbon atoms per molecule are operable.

Alcohols which can be used as the olefin-acting material are the secondary and tertiary monohydric alcohols, including cyclic alcohols, and with such alcohols are used a strong acid catalyst such as hydrogen fluoride or sulfuric acid. Secondary and tertiary alcohols which give good results include, for example, secondary propyl alcohol, secondary and tertiary butyl alcohol, and the secondary and tertiary amyl, hexyl, heptyl, octyl, nonyl and decyl alcohols, cyclopentanol, cyclohexanol, and homologues thereof. It is preferred to use an alcohol having not more than about 10 carbon atoms per molecule, but alcohols having up to about 20 carbon atoms per molecule are operable.

The quantities of reactants employed may be varied substantially and good results obtained. From 1 to 20 moles of the saturated hydrocarbon can be employed for each mole of olefin used, i. e., a mole ratio of saturated hydrocarbon to olefin of from 1:1 to 20:1 can be used, but preferably the mole ratio is within the range of from 2:1 to 5:1. The quantity of carbon monoxide employed should be at least equal to the quantity of olefin-acting material on a molar basis, but the pressure thereof must be less than 50 atmospheres, since at higher pressures reaction between the carbon monoxide and olefin-acting material becomes appreciable. The pressure must be at least sufficient to maintain liquid phase reaction.

The quantity of acid catalyst to employ can be advantageously varied, the optimum quantity depending on the particular acid being used and one the olefin-acting material employed. In general the quantity of acid catalyst will be such that the mole ratio of acid to olefin-acting material will be from 1:1 to 10:1, and preferably is from 3:1 to 7:1. The acid concentration in the acid layer must be maintained above 80% by weight, and preferably is maintained above 90% by weight of the acid layer. The quantity of water present in the acid layer must be below 10% by weight, and preferably is maintained below about 5% by weight of the acid layer.

The temperature of the reaction mixture during the carbonylation can be varied within the range of from about −120° C. to about 100° C., and preferably is maintained in the range of from about 0° C. to 50° C. In general, lower temperatures can be used with the combination of tertiary alkyl fluorides and boron trifluoride, and in general with olefin-acting materials having a tertiary carbon atom. Temperatures in the higher portion of the stated range are advantageously used with olefin-acting materials having a secondary carbon atom, and with the latter a reaction temperature of above about 20° C. is preferred.

Time is not considered a critical variable, since the carbonylation reaction proceeds practically instantaneously, i. e., the reaction is complete as soon as the reactants are brought together. Hence the time of contact is largely determined by practical considerations and will be usually from 1 to 60 minutes.

After separation of the acid layer from the organic layer, water is added to the acid layer to hydrolyze the reaction product, which may be for example an acid fluoride, to the corresponding organic acid. The temperature during hydrolysis should be from 0° C. to 100° C., and preferably is in the range of from 20° C. to 50° C. At least 1 mole of water should be added per mole of the reaction product, and preferably from about 2 to 5 moles of water per mole of reaction product is used. After hydrolysis, the organic acid product can be recovered by any convenient means, such as by distillation.

In order to illustrate an embodiment of the invention, 3 moles of isopentane and 5 moles of hydrogen fluoride are introduced into a contactor provided with a stirrer. With the temperature of the contactor regulated at about 20° C., separate streams of carbon monoxide and isobutylene are introduced into the contactor over a period of about 10 minutes during vigorous agitation, the mole ratio of carbon monoxide to isobutylene during the introduction being maintained at about 1.5 to 1, and a total of about 2 moles of carbon monoxide being added. The pressure in the reactor is maintained below 30 atmospheres. After the introduction of carbon monoxide and isobutylene, stirring is continued for about 5 minutes. The reaction mixture is then allowed to separate into a lower acid layer and an upper hydrocarbon layer. The lower acid layer is separated and about 4 moles of water added thereto, at a temperature of about 20° C., to hydrolyze the reaction product to the organic acid. The organic acid is then separated, a yield of about 0.5 mole of di-methylethyl acetic acid (2,2-dimethyl butanoic acid) being obtained. From the separated organic layer, unreacted isopentane is recovered and is advantageously recycled to the process. Isobutane in a quantity substantially equivalent to the quantity of isobutylene introduced is also recovered from the organic layer and may be further processed to valuable products or may be dehydrogenated to form isobutylene and reused in the process.

The foregoing specific embodiment illustrates the process of the invention. When other saturated hydrocarbons having a tertiary hydrogen atom are substituted for isopentane, and/or other olefin-acting materials are substituted for isobutylene, and/or other catalysts are substituted for hydrogen fluoride, within the limits herein defined, substantially equivalent results are obtained.

The invention claimed is:

1. Process for preparing organic acids which comprises bringing together, in the liquid phase at a pressure below about 50 atmospheres, an inorganic acid catalyst selected from the group consisting of hydrogen fluoride, sulfuric acid, hydrated boron trifluoride and fluosulfonic acid and an olefin-acting material having from 2 to 20 carbon atoms selected from the group consisting of olefins, alkyl chlorides, alkyl fluorides, secondary monohydric alcohols and tertiary monohydric alcohols in the presence of carbon monoxide and a saturated hydrocarbon having at least one tertiary hydrogen atom per molecule, separating an acid phase containing the reaction product of the carbon monoxide and said saturated hydrocarbon from the reaction mixture, hydrolyzing said reaction product to form an organic acid, and recovering the so-produced acid.

2. The process according to claim 1 wherein said olefin-acting material is a tertiary olefin.

3. The process according to claim 1 wherein said olefin-acting material is an alkyl fluoride.

4. The process according to claim 1 wherein said olefin-acting material is a tertiary monohydric alcohol.

5. Process for preparing organic acids having a quaternary alpha carbon atom which comprises bringing together, in the liquid phase, an inorganic acid catalyst selected from the group consisting of hydrogen fluoride, sulfuric acid, hydrated boron trifluoride and fluosulfonic acid and an olefin-acting material having from 2 to 20 carbon atoms selected from the group consisting of olefins, alkyl chlorides, alkyl fluorides, secondary monohydric alcohols and tertiary monohydric alcohols in the presence of carbon monoxide and a saturated hydrocarbon having at least one tertiary hydrogen atom per molecule, wherein the pressure of carbon monoxide is maintained below about 50 atmospheres and the mole ratio of said saturated hydrocarbon to said olefin-acting material is from 1:1 to 20:1, separating an acid phase containing the reaction product of the carbon monoxide and said saturated hydrocarbon from the reaction mixture, and hydrolyzing said reaction product to form an organic acid having one more carbon atom than said saturated hydrocarbon.

6. Process according to claim 5 wherein said olefin-acting material is a tertiary olefin.

7. Process according to claim 5 wherein said olefin-acting material is an alkyl chloride.

8. Process according to claim 5 wherein said olefin-acting material is an alkyl fluoride.

9. Process according to claim 5 wherein the olefin-acting material is a secondary monohydric alcohol.

10. Process according to claim 5 wherein the olefin-acting material is a tertiary monohydric alcohol.

11. Process for preparing organic acids having a quaternary alpha carbon atom which comprises bringing together, in the liquid phase, an inorganic acid catalyst selected from the group consisting of hydrogen fluoride, sulfuric acid, hydrated boron trifluoride and fluosulfonic acid and an olefin-acting material having from 2 to 20 carbon atoms selected from the group consisting of olefins, alkyl chlorides, alkyl fluorides, secondary monohydric alcohols and tertiary monohydric alcohols in the presence of carbon monoxide and an isoparaffin having at least one tertiary hydrogen atom per molecule, wherein the pressure of carbon monoxide is maintained below about 50 atmospheres and the mole ratio of said isoparaffin to said olefin-acting material is from 1:1 to 20:1, separating an acid phase containing the reaction product of the carbon monoxide and said isoparaffin from the reaction mixture, and hydrolyzing said reaction product to form an organic acid having one more carbon atom than said isoparaffin.

12. Process according to claim 11 wherein said isoparaffin is isobutane.

13. Process according to claim 11 wherein said isoparaffin is isopentane.

14. Process for preparing organic acids having a quaternary alpha carbon atom which comprises bringing together, in the liquid phase, an inorganic acid catalyst selected from the group consisting of hydrogen fluoride, sulfuric acid, hydrated boron trifluoride and fluosulfonic acid and an olefin-acting material having from 2 to 20 carbon atoms selected from the group consisting of olefins, alkyl chlorides, alkyl fluorides, secondary monohydric alcohols and tertiary monohydric alcohols in the presence of carbon monoxide and a cycloparaffin having at least one tertiary hydrogen atom per molecule, wherein the pressure of carbon monoxide is maintained below about 50 atmospheres and the mole ratio of said cycloparaffin to said olefin-acting material is from 1:1 to 20:1, separating an acid phase containing the reaction product of the carbon monoxide and said cycloparaffin from the reaction mixture, and hydrolyzing said reaction product to form an organic acid having one more carbon atom than said cycloparaffin.

15. Process according to claim 14 wherein said cycloparaffin is methylcyclopentane.

16. Process according to claim 14 wherein said cycloparaffin is methylcyclohexane.

17. Process for the preparation of 2,2-dimethyl butanoic acid which comprises bringing together, in the liquid phase at a pressure below about 50 atmospheres, hydrogen fluoride and isobutylene in the presence of carbon monoxide and isopentane wherein the mole ratio of said isopentane to said isobutylene is from 1:1 to 20:1, separating a lower acid layer containing the reaction product of the carbon monoxide and said isopentane from an upper hydrocarbon layer, hydrolyzing said reaction product to form 2,2-dimethyl butanoic acid, and recovering from the hydrocarbon layer isobutane in a quantity substantially equivalent to the quantity of isobutylene introduced into the process.

References Cited in the file of this patent

UNITED STATES PATENTS

| | | |
|---|---|---|
| 1,905,383 | Huppke et al. | Apr. 25, 1933 |
| 2,426,870 | Hill | Sept. 2, 1947 |
| 2,580,070 | Brooks et al. | Dec. 25, 1951 |

FOREIGN PATENTS

| | | |
|---|---|---|
| 547,101 | Great Britain | Aug. 13, 1942 |

OTHER REFERENCES

Wagner et al.: Synthetic Organic Chemistry, John Wiley & Sons, Inc., New York (1953), p. 418.